(12) United States Patent
Agarwal et al.

(10) Patent No.: US 8,941,657 B2
(45) Date of Patent: Jan. 27, 2015

(54) CALCULATING ZOOM LEVEL TIMELINE DATA

(75) Inventors: Mayank Agarwal, Redmond, WA (US);
Xinhua Ji, Redmond, WA (US);
Alexander Dadiomov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 919 days.

(21) Appl. No.: 13/113,422

(22) Filed: May 23, 2011

(65) Prior Publication Data

US 2012/0299965 A1 Nov. 29, 2012

(51) Int. Cl.
G06T 11/20 (2006.01)
G09G 5/00 (2006.01)
G06F 17/30 (2006.01)

(52) U.S. Cl.
CPC .... *G06F 17/30551* (2013.01); *G06F 17/30572* (2013.01)
USPC .......................................... 345/440; 345/660

(58) Field of Classification Search
CPC ...................... G06F 17/30551; G06F 17/30572
USPC .................................................. 345/440, 660
See application file for complete search history.

(56) References Cited

U.S. PATENT DOCUMENTS

| | | | |
|---|---|---|---|
| 5,828,883 A | 10/1998 | Hall | |
| 6,651,243 B1 | 11/2003 | Berry et al. | |
| 6,769,126 B1 | 7/2004 | Pekowski | |
| 7,386,686 B2 | 6/2008 | Wu | |
| 7,519,961 B2 | 4/2009 | Alexander | |
| 2004/0168115 A1* | 8/2004 | Bauernschmidt et al. | 715/500 |
| 2005/0223080 A1 | 10/2005 | Gray | |
| 2006/0069682 A1 | 3/2006 | Fanous | |
| 2007/0083856 A1 | 4/2007 | Chilimbi | |
| 2007/0245238 A1 | 10/2007 | Fugitt | |
| 2008/0189717 A1* | 8/2008 | Agarwal et al. | 718/106 |
| 2009/0241095 A1 | 9/2009 | Jones | |
| 2009/0276714 A1 | 11/2009 | Kandlikar | |
| 2010/0017791 A1 | 1/2010 | Finkler | |

(Continued)

FOREIGN PATENT DOCUMENTS

WO WO 2007053457 A2 * 5/2007

OTHER PUBLICATIONS

Shashidhar Mysore, Banit Agrawal, Rodolfo Neuber, Timothy Sherwood, Nisheeth Shrivastava, Subhash Suri, Formulating and Implementing Profiling over Adaptive Ranges, 2008, ACM Transactions on Architecture and Code Optimization, 5(1):2:1-32.*

(Continued)

*Primary Examiner* — Xiao Wu
*Assistant Examiner* — Michael J Cobb
(74) *Attorney, Agent, or Firm* — Kevin Sullivan; David Andrews; Micky Minhas

(57) ABSTRACT

The present invention extends to methods, systems, and computer program products for calculating zoom level timeline data. Event aggregators are configured to read execution data from sequentially received input buffers and pre-calculate data chunks for a specified zoom level to create a zoom tree. The density of execution data can be used to determine when pre-calculation is beneficial. In response to a user request, pre-calculated data can be combined with responsively calculated data for presentation to a user. User requests can specify zoom levels and time ranges over which data is to be presented.

23 Claims, 8 Drawing Sheets

(56) References Cited

U.S. PATENT DOCUMENTS

2010/0194766 A1* 8/2010 Nakagawa ............... 345/543
2010/0211618 A1* 8/2010 Anderson et al. ............ 707/812
2012/0054721 A1  3/2012 Dadiomov

OTHER PUBLICATIONS

Shashidhar Mysore, Banit Agrawal, Timothy Sherwood, Nisheeth Shrivastava, Subhash Suri, Profiling over Adaptive Ranges, 2006, Proceedings of the International Symposium on Code Generation and Optimization (CGO '06).*

Notice of Allowance dated Apr. 9, 2013 cited in U.S. Appl. No. 12/868,495.

Mark Friedman, "Dynamic Performance Analysis: Rules and Guidance for Visual Studio Profiling Tools Users", Published Date: May 2010, (10 pages).

Byeongcheol Lee et al., "Correcting the Dynamic Call Graph Using Control-Flow Constraints", Retrieved Date: Jul. 28, 2010 (22 pages).

John Whaley, "A Portable Sampling-Based Profiler for Java Virtual Machines", Published Date: Jun. 2000 (10 pages).

Martin Hirzel & Trishul Chilimbi, "Bursty Tracing: A Framework for Low-Overhead Temporal Profiling", Retrieved Date: Jul. 28, 2010.

Marty Itzkowitz, "The Sun Studio Performance Tools", Published Date: Nov. 10, 2005, http://developers.sun.com/solaris/articles/perftools.html (15 pages).

Office Action dated Oct. 5, 2012 cited in U.S. Appl. No. 12/868,495.

Rivest, Sonia, "Toward Better Support for Spatial Decision Making: Defining the Characteristics of Spatial On-Line Analytical Processing (SOLAP)", Geomatica Vo. 55. No. 4, 2001, pp. 539 to 555.

Yang, Li, "Multiresolution Data Aggregation and Analytical Exploration of Large Data Sets", Based on information and belief available, at least as early as Dec. 30, 2010, 5 pages.

Carmo, Maria Beatriz, et al., "Visualization of Large Volume of Information Using Different Representations", Based on information and belief available, at least as early as Dec. 30, 2010, 5 pages.

Gao, Jinzhu, et al., "A Parallel Multiresolution Volume Rendering Algorithm for Large Data Visualization", Dec. 9, 2004, 21 pages.

Rhodes, Philip J., et al., "Iteration Aware Prefetching for Large Multidimensional Scientific Datasets", Based on information and belief available, at least as early as Dec. 30, 2010, 10 pages.

* cited by examiner

| Zoom Level | Number Of Chunks |
|---|---|
| 0 | 1 |
| 1 | 4 |
| 2 | 16 |
| 3 | 64 |
| X | $4^X$ |

*Figure 4*

CALCULATING ZOOM LEVEL TIMELINE DATA

CROSS-REFERENCE TO RELATED APPLICATIONS

Not Applicable.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be used to show the execution history of a computer system. For instance, execution visualizers may be used to visually show a timeline of how a computer system's processing resources have been used. The timeline may show execution dynamics for different applications, for different central processing unit (CPU) threads, for individual tasks or for other processes. These execution visualizers are configured to display execution data at different zoom levels or levels of specificity. Execution data can come, for example, from a previously collected trace of activities that occurred during execution of a software application, from an ongoing live session, etc. At higher zoom levels (i.e. zoomed in), an increased number of details are shown. At lower zoom levels (i.e. zoomed out), details are aggregated together, and fewer are shown. In some cases, data for each zoom level may be pre-calculated. However, pre-calculation for each zoom level requires a separate pass over the input execution data.

BRIEF SUMMARY

The present invention extends to methods, systems, and computer program products for calculating zoom level timeline data. A computer system maintains a plurality of different event aggregators that are configured to receive buffers containing raw computing activity from a stream of raw computing activity. Each of the plurality of different event aggregators corresponds to a different specified zoom level and is configured to pre-calculate chunks of event presentation data for presentation at the different specified zoom level. Collectively the plurality of event aggregators pre-calculate event presentation data for creating a zoom tree that includes pre-calculated event presentation data at each of the different specified zoom levels.

In some embodiments, a static number of different event aggregators is used from a single pass over raw computing activity for the duration of a specified time span selected to pre-calculate event presentation data. A zoom tree is populated with one or more chunks of event presentation data. Each chunk can contain pre-calculated data for a specified zoom level for a specified range and duration of time. Accordingly, the event presentation data can be visually presented more efficiently in response to a user request. The one or more chunks of event presentation data are sufficient for visual presentation at any zoom level at any time within the specified time span.

For each zoom level in the plurality of zoom levels and in parallel with each of the other zoom levels in the plurality of zoom levels, one or more buffers from the stream of raw computing activity are sequentially delivered to an event aggregator for the zoom level during the single pass over the raw computing activity. Each buffer contains raw computing activity data spanning a specified time interval. Each of the one or more buffers is adjacent in time to a previously consumed buffer. The one or more buffers collectively contain raw computing data spanning the specified time span.

The event aggregator pre-calculates one or more chunks of event presentation data from the one or more buffers. The event presentation data is for visual presentation at the zoom level. Each pre-calculated chunk of event presentation data covers a pre-defined portion of the specified time span for the zoom level. For one or more zoom levels in the plurality of zoom levels, the corresponding zoom aggregator for the zoom level aggregates a plurality of portions of raw computing activity into an aggregated event. The aggregated event is for inclusion in a chunk of event presentation data for presentation at the zoom level.

A request to visually display event presentation data within the specified time span at a specified zoom level is received. The specified zoom level is selected from among the plurality of different zoom levels. In response to the request, event presentation data from one or more chunks of data in the pre-calculated zoom tree is presented at the specified zoom level.

In other embodiments, the number of different event aggregators used to pre-calculate event presentation data varies at different times within a specified time span. Chunking criteria is accessed. The chunking criteria defines ranges of time for which chunks of event presentation data are to be pre-calculated and ranges of time for which chunks of event presentation data are not to be pre-calculated for a zoom level based on characteristics of raw computing data. A zoom tree is dynamically populated with one or more chunks for event presentation data.

For each zoom level in the plurality of zoom levels and in parallel with each of the other zoom levels in the plurality of zoom levels, one or more buffers from a stream of raw computing activity are sequentially delivered to an event aggregator for the zoom level during the single pass over the raw computing activity. Each buffer contains raw computing activity data spanning a specified time interval. Each of the one or more buffers is adjacent in time to a previously consumed buffer. The one or more buffers collectively contain raw computing data spanning the specified time span.

The characteristics of the raw computing activity contained in the one or more buffers are assessed. The event aggregator pre-calculates one or more chunks of event presentation data in accordance with the chunking criteria based on the assessed characteristics of the raw computing activity. Each pre-calculated chunk of event presentation data covers a portion of the specified time span. The event presentation data is for visual presentation at the zoom level. For one or more zoom levels in the plurality of zoom levels, a corresponding event aggregator determines not to pre-calculate a chunk of event data for at least part of the specified time span in accordance with the chunking criteria based on the assessed characteristics of the raw computing activity.

A request to visually display event presentation data within the specified time span at a specified zoom level is received. The specified zoom level is selected from among the plurality of different zoom levels. In response to the request, event presentation data from one or more pre-calculated chunks of data in the dynamically populated zoom tree is presented at the specified zoom level. Gaps in the pre-calculated event presentation data can be supplemented with non pre-calculated (e.g., essentially real time generated) event presentation data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates an example relationship between zoom level and number of chunks.

DETAILED DESCRIPTION

Figure 1:
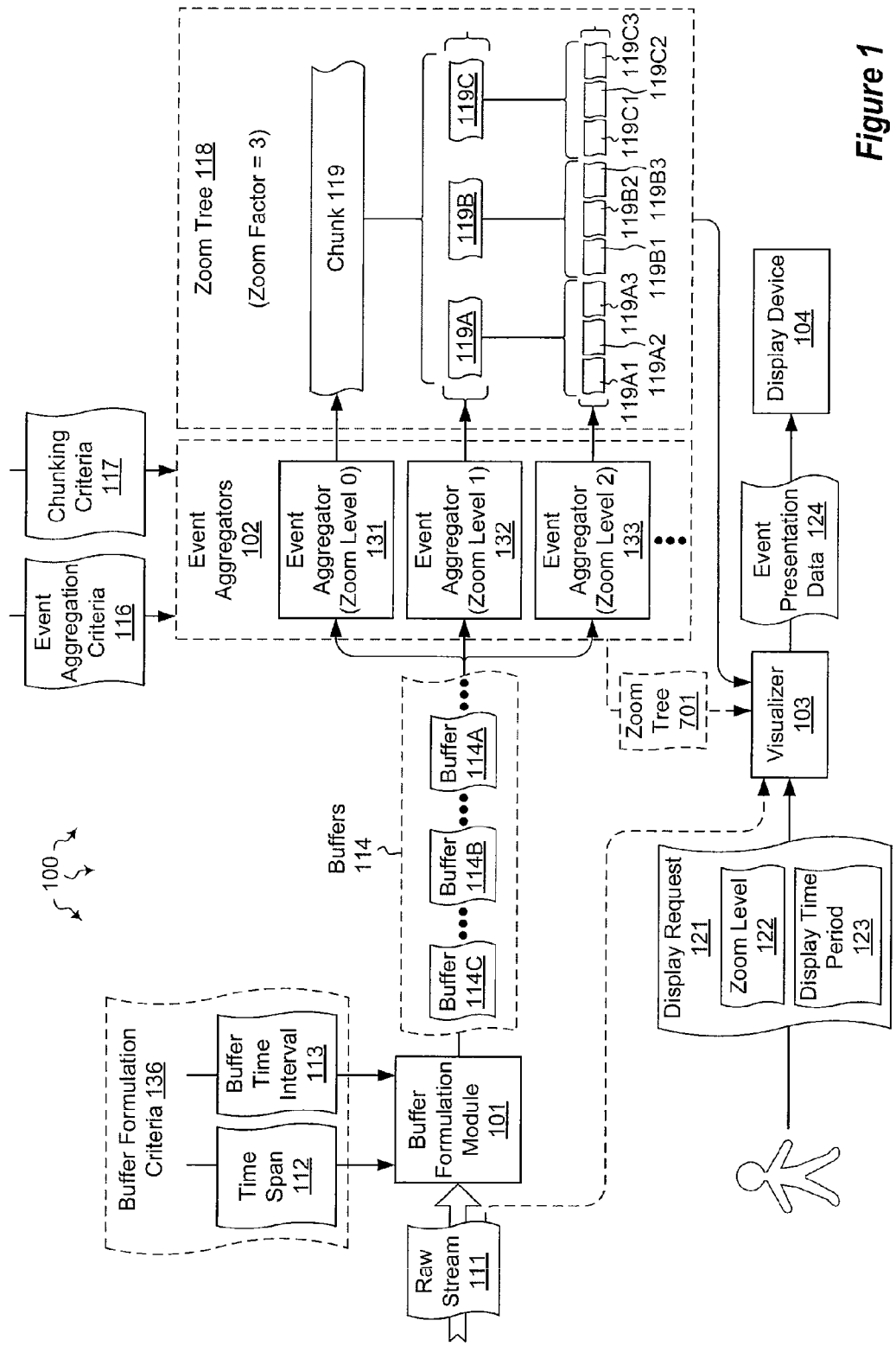
FIG. 1 illustrates a computer architecture for calculating zoom level timeline data.

The present invention extends to methods, systems, and computer program products for calculating zoom level timeline data. A computer system maintains a plurality of different event aggregators that are configured to receive buffers containing raw computing activity from a stream of raw computing activity. Each of the plurality of different event aggregators corresponds to a different specified zoom level and is configured to pre-calculate chunks of event presentation data for presentation at the different specified zoom level. Collectively the plurality of event aggregators pre-calculate event presentation data for creating a zoom tree that includes pre-calculated event presentation data at each of the different specified zoom levels.

In some embodiments, a static number of different event aggregators is used from a single pass over raw computing activity for the duration of a specified time span selected to pre-calculate event presentation data. A zoom tree is populated with one or more chunks of event presentation data. Each chunk can contain pre-calculated data for a specified zoom level for a specified range and duration of time. Accordingly, the event presentation data can be visually presented more efficiently in response to a user request. The one or more chunks of event presentation data are sufficient for visual presentation at any zoom level at any time within the specified time span.

For each zoom level in the plurality of zoom levels and in parallel with each of the other zoom levels in the plurality of zoom levels, one or more buffers from the stream of raw computing activity are sequentially delivered to an event aggregator for the zoom level during the single pass over the raw computing activity. Each buffer contains raw computing activity data spanning a specified time interval. Each of the one or more buffers is adjacent in time to a previously consumed buffer. The one or more buffers collectively containing raw computing data spanning the specified time span.

The event aggregator pre-calculates one or more chunks of event presentation data from the one or more buffers. The event presentation data is for visual presentation at the zoom level. Each pre-calculated chunk of event presentation data covers a pre-defined portion of the specified time span for the zoom level. For one or more zoom levels in the plurality of zoom levels, the corresponding zoom aggregator for the zoom level aggregates a plurality of portions of raw computing activity into an aggregated event. The aggregated event is for inclusion in a chunk of event presentation data for presentation at the zoom level.

A request to visually display event presentation data within the specified time span at a specified zoom level is received. The specified zoom level is selected from among the plurality of different zoom levels. In response to the request, event presentation data from one or more chunks of data in the pre-calculated zoom tree is presented at the specified zoom level.

In other embodiments, the number of different event aggregators used to pre-calculate event presentation data varies at different times within a specified time span. Chunking criteria is accessed. The chunking criteria defines ranges of time for which chunks of event presentation data are to be pre-calculated and ranges of time for which chunks of event presentation data are not to be pre-calculated for a zoom level based on characteristics of raw computing data. A zoom tree is dynamically populated with one or more chunks for event presentation data.

For each zoom level in the plurality of zoom levels and in parallel with each of the other zoom levels in the plurality of zoom levels, one or more buffers from a stream of raw computing activity are sequentially delivered to an event aggregator for the zoom level during the single pass over the raw computing activity. Each buffer contains raw computing activity data spanning a specified time interval. Each of the one or more buffers is adjacent in time to a previously consumed buffer. The one or more buffers collectively contain raw computing data spanning the specified time span.

The characteristics of the raw computing activity contained in the one or more buffers are assessed. The event aggregator pre-calculates one or more chunks of event presentation data in accordance with the chunking criteria based on the assessed characteristics of the raw computing activity. Each pre-calculated chunk of event presentation data covers a portion of the specified time span. The event presentation data is for visual presentation at the zoom level. For one or more zoom levels in the plurality of zoom levels, a corresponding event aggregator determines not to pre-calculate a chunk of event data for at least part of the specified time span in accordance with the chunking criteria based on the assessed characteristics of the raw computing activity.

A request to visually display event presentation data within the specified time span at a specified zoom level is received. The specified zoom level is selected from among the plurality of different zoom levels. In response to the request, event presentation data from one or more pre-calculated chunks of data in the dynamically populated zoom tree is presented at the specified zoom level. Gaps in the pre-calculated event presentation data can be supplemented with non pre-calculated (e.g., essentially real time generated) event presentation data.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 for calculating zoom level timeline data. Referring to FIG. 1, computer architecture 100 includes buffer formulation module 101, event aggregators 102, visualizer 103, and display device 104. Each of the depicted components can be connected to one another over (or be part of) a network, such as, for example, a Local Area Network ("LAN"), a Wide Area Network ("WAN"), and even the Internet. Accordingly, the depicted components as well as any other connected nodes and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In general, buffer formation module is configured to receive a stream of raw computing activities and formulate buffers of raw computing activities for a specified time span. Buffer formulation module 101 can receive a stream of raw computing activities as well as buffer formation criteria, such as, for example, a time span and buffer time interval. Other buffer criteria could indicate buffer size in terms of number of activities, such as, for example, each buffer is to contain the next 100 activities. Further buffer criteria permit buffers to span varying amounts of time depending on data density. Based on the buffer formation criteria, buffer formulation module 101 can formulate buffers of raw computing activities, for example, spanning the time span. Buffer formulation module 101 can sequentially send buffers of raw computing activities to each event aggregator in event aggregators 102 in parallel. That is, each event buffer is sent to each event aggregator in order. Accordingly, raw computing activities can be sent to event aggregators 102 in a single pass over the stream of raw computing activities.

As depicted, event aggregators 102 include event aggregators 131, 132, and 133. Each of event aggregators 131, 132, and 133 is configured to sequentially receive buffers of raw computing activities. From the received buffers of raw computing activities, event aggregators 131, 132, and 133 can be configured to pre-calculate chunks of event presentation data for presentation at a specified zoom level. Chunk size approximately corresponds to the amount of time displayed on one screen at the specified zoom level.

Collectively, event aggregators 102 can generate a zoom tree containing pre-calculated event presentation data for presentation at a variety of different zoom levels. Pre-calculation of event presentation data facilitates smooth responses to user actions, such as, for example, scrolling and zooming.

At lower zoom levels (one screen of data spanning more time), event presentation data is configured for more coarse presentation (and thus each chunk is generated from more buffers). At higher zoom levels (one screen of data spanning less time), event presentation data is configured for more granular presentation (and thus each chunk is generated from fewer buffers). Event aggregation criteria can be used to specify how chunking of event presentation data is to occur at different zoom levels (e.g., zoom factor, number of zoom levels, when to combine separate events into a combined event within a chunk, etc.). Chunking criteria can be used to specify when event presentation data is or is not to be chunked for a specified zoom level (e.g., when data density makes pre-calculation less resource efficient).

Visualizer 103 is configured to access a zoom tree and select event presentation data for presentation at a display device in accordance with a user display request. Based on a zoom level and display time period included in a display request, visualizer 103 can select event presentation data from one or more chunks of event presentation data pre-calculated for the zoom level. Visualizer 103 can send the selected event presentation data to display device 104 for display. Display device 104 is configured to display data, including event presentation data, and can be a general purpose display device, such as, for example, a computer monitor and/or television.

Figure 2:
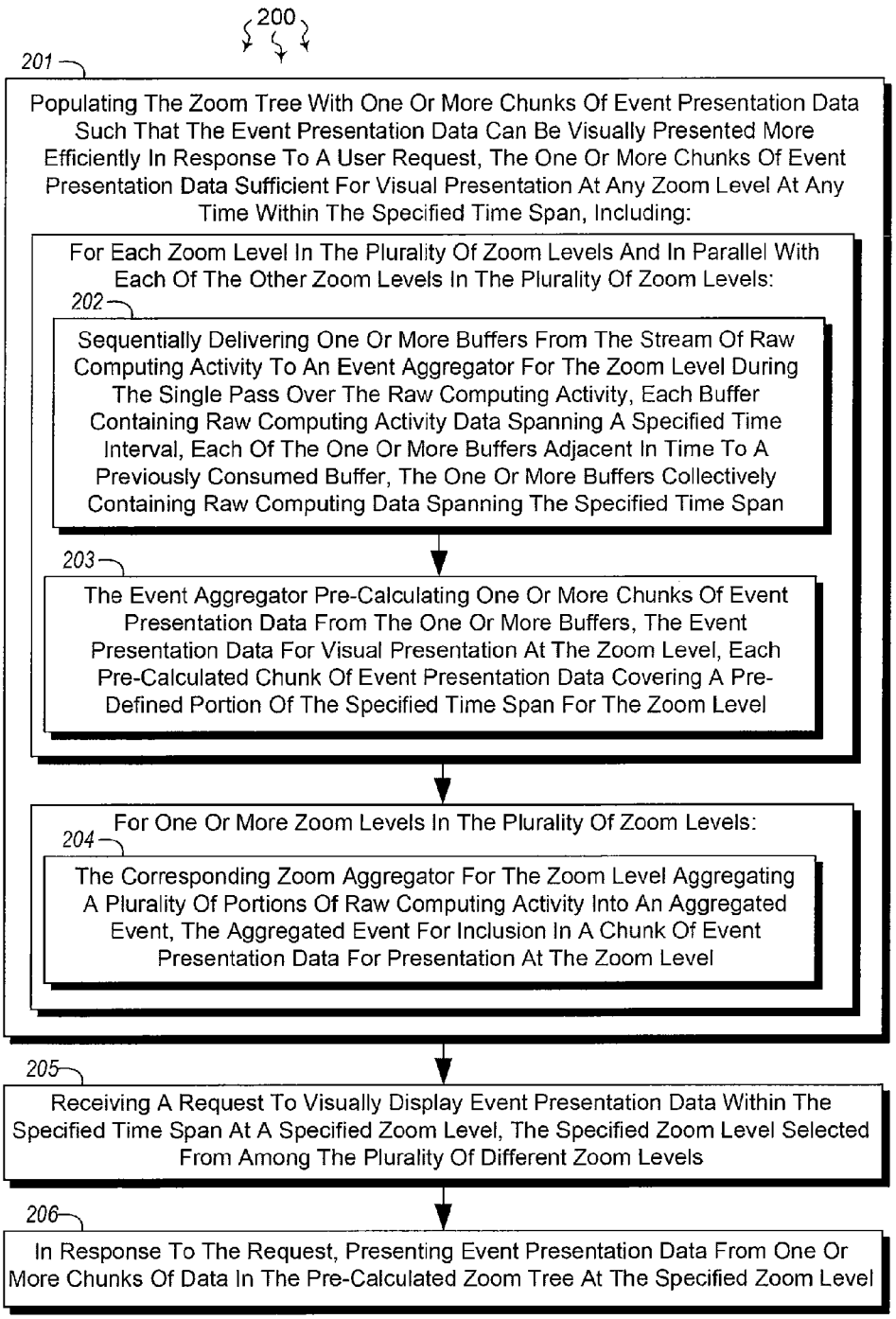
FIG. 2 illustrates a flowchart of an example method for calculating zoom level timeline data.

FIG. 2 illustrates a flowchart of an example method 200 for calculating zoom level timeline data. Method 200 will be described with respect to the components and data in computer architecture 100.

Method 200 an act of populating the zoom tree with one or more chunks of event presentation data such that the event presentation data can be visually presented more efficiently in response to a user request, the one or more chunks of event presentation data sufficient for visual presentation at any zoom level at any time within the specified time span (act 201). For example, event aggregators 102 can populate zoom tree 118 with chunks of presentation data. Event aggregation criteria 116 can specify that there is to be three zoom levels, zoom level 0, zoom level 1, and zoom level 2. As such, zoom tree 118 can be populated with chunk 119 for zoom level 0, with chunks 119A, 119B, and 119C for zoom level 1, and with chunks 119A1, 119A2, 119A3, 119B1, 119B2, 119B3, 119C1, 119C2, and 119C3 for zoom level 2. Accordingly, zoom tree 118 provides pre-calculated event presentation data sufficient for visual presentation at zoom levels 0, 1, and 2 at any time within time span 112.

Act 201 includes, for each zoom level in the plurality of zoom levels and in parallel with each of the other zoom levels in the plurality of zoom levels, an act of sequentially delivering one or more buffers from the stream of raw computing activity to an event aggregator for the zoom level during the single pass over the raw computing activity, each buffer containing raw computing activity data spanning a specified time interval, each of the one or more buffers adjacent in time to a previously consumed buffer, the one or more buffers collectively containing raw computing data spanning the specified time span (act 202). For example, buffer formulation module 101 can sequentially deliver adjacent buffers 114 (buffer 114A, 114B, 114C, etc) to event aggregators 131, 132, and 133 in parallel with one another during a single pass over raw stream 111.

Buffer formulation module can receive raw stream 111 (of raw computing events) and buffer formulation criteria 136, such as, for example, time span 112, and buffer time interval 113. Time span 112 specifies a time span over which event presentation data can be viewed. Buffer time interval 133 indicates a time interval for each buffer. Each buffer output into buffers 114 includes raw computing activities spanning an amount of time equal to buffer time interval 113. Thus, if time span 112 is nine seconds and buffer time interval 113 is 25 ms, 36 buffers (e.g., buffers 114A, 114B, 114C, etc) are formulated for sequential delivery to event aggregators 102.

Other types of buffer formulation criteria can also be received and used as a basis to formulate buffers. For example, buffer formulation criteria can indicate that fixed sized buffers in terms of the number of activities are to be used, such as, each buffer is to contain the next 1000 activities.

Act 201 includes, for each zoom level in the plurality of zoom levels and in parallel with each of the other zoom levels in the plurality of zoom levels, an act of the event aggregator pre-calculating one or more chunks of event presentation data from the one or more buffers, the event presentation data for visual presentation at the zoom level, each pre-calculated chunk of event presentation data covering a pre-defined portion of the specified time span for the zoom level (act 203). A zoom factor can specify the difference in zoom between adjacent zoom levels. As depicted, zoom tree 119 has a zoom factor of 3. In general, zoom level x has (Zoom Factor)$^x$ number of chunks. For example, event aggregator 131 can pre-calculate ($3^0$ or one) chunk 119 for zoom level 0, event aggregator 132 can pre-calculate ($3^1$ or three) chunks 119A, 119B, and 119C for zoom level 1, event aggregator 133 can pre-calculate ($3^2$ or nine) chunks 119A1, 119A2, 119A3, 119B1, 119B2, 119B3, 119C1, 119C2, and 119C3 for zoom level 2.

Further, event presentation data at zoom level 1 is presented at 3 times the zoom of event presentation data presented at zoom level 0. Similarly, event presentation data at zoom level 2 is presented at 3 times the zoom of event presentation data presented at zoom level 1. Thus, for example, if time span 112 was nine seconds, chunk 119 would span nine seconds, each of chunks 119A, 119B, and 119C would span three seconds, and each of chunks 119A1, 119A2, 119A3, 119B1, 119B2, 119B3, 119C1, 119C2, and 119C3 would span one second.

As such, event aggregators can pre-calculate chunks from different numbers of buffers (and thus at different rates). For example, when time span 112 is nine seconds and buffer time interval 113 is 25 ms, event aggregator 133 outputs a chunk (e.g., 119A1, 119A2, 119A3, 119B1, 119B2, 119B3, 119C1, 119C2, and 119C3) for every four buffers (or one second of event presentation data), event aggregator 132 outputs a chunk (e.g., 119A, 119B, and 119C) every 12 buffers (or 3 seconds of event presentation data), and event aggregator 131 outputs a chunk (e.g., chunk 119) on the 36th buffer (or 9 seconds of event presentation data).

Figure 4:
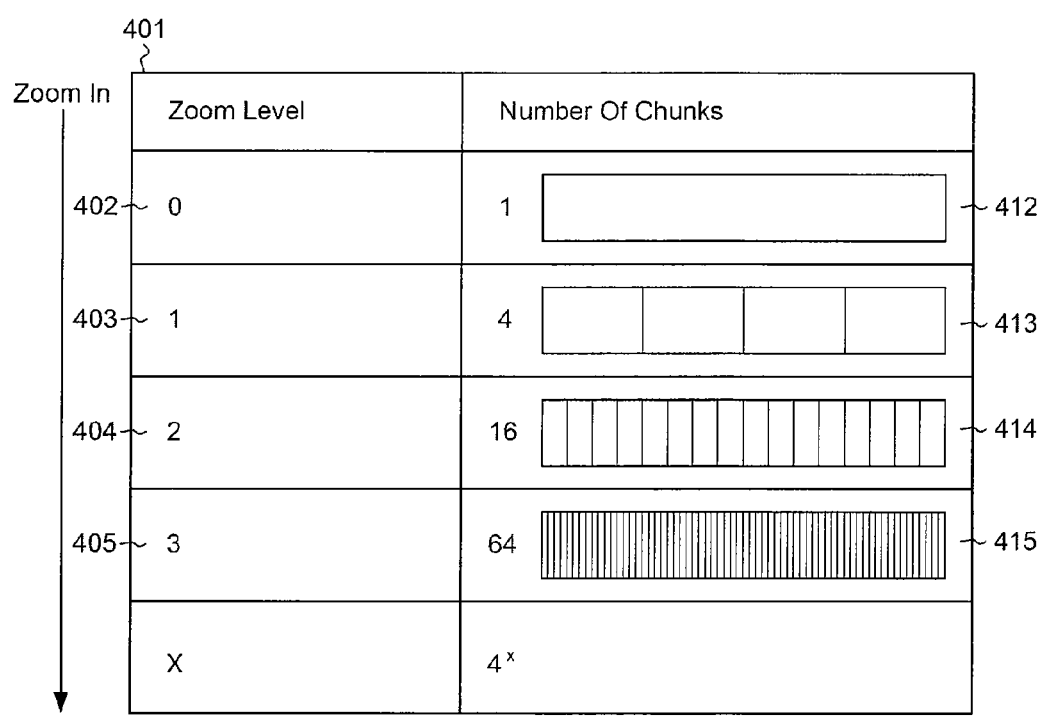

Referring now to FIG. 4, FIG. 4 depicts another example relationship between zoom factor and number of chunks. As described, the total time for which execution data was collected is divided into equal-sized chunks for each zoom level. The lowest zoom level (most zoomed out level) has a single chunk since a specified time span time is represented in a single screen. If the zoom factor is 4, then the number of chunks follows the relationship depicted in box 401 of FIG. 4.

Thus, at zoom level 402, the number of data chunks 412 is $4^{(0)}$ or 1. As shown in box 401, the number of chunks increases as the zoom level increases. At zoom level 403, the number of data chunks 413 is $4^{(1)}$ or 4. At zoom level 404, the number of data chunks 414 is $4^{(2)}$ or 16. At zoom level 405, the number of data chunks 415 is $4^{(3)}$ or 64. Generally at zoom level x, the number of data chunks is equal to $4^{(x)}$.

Figure 5:
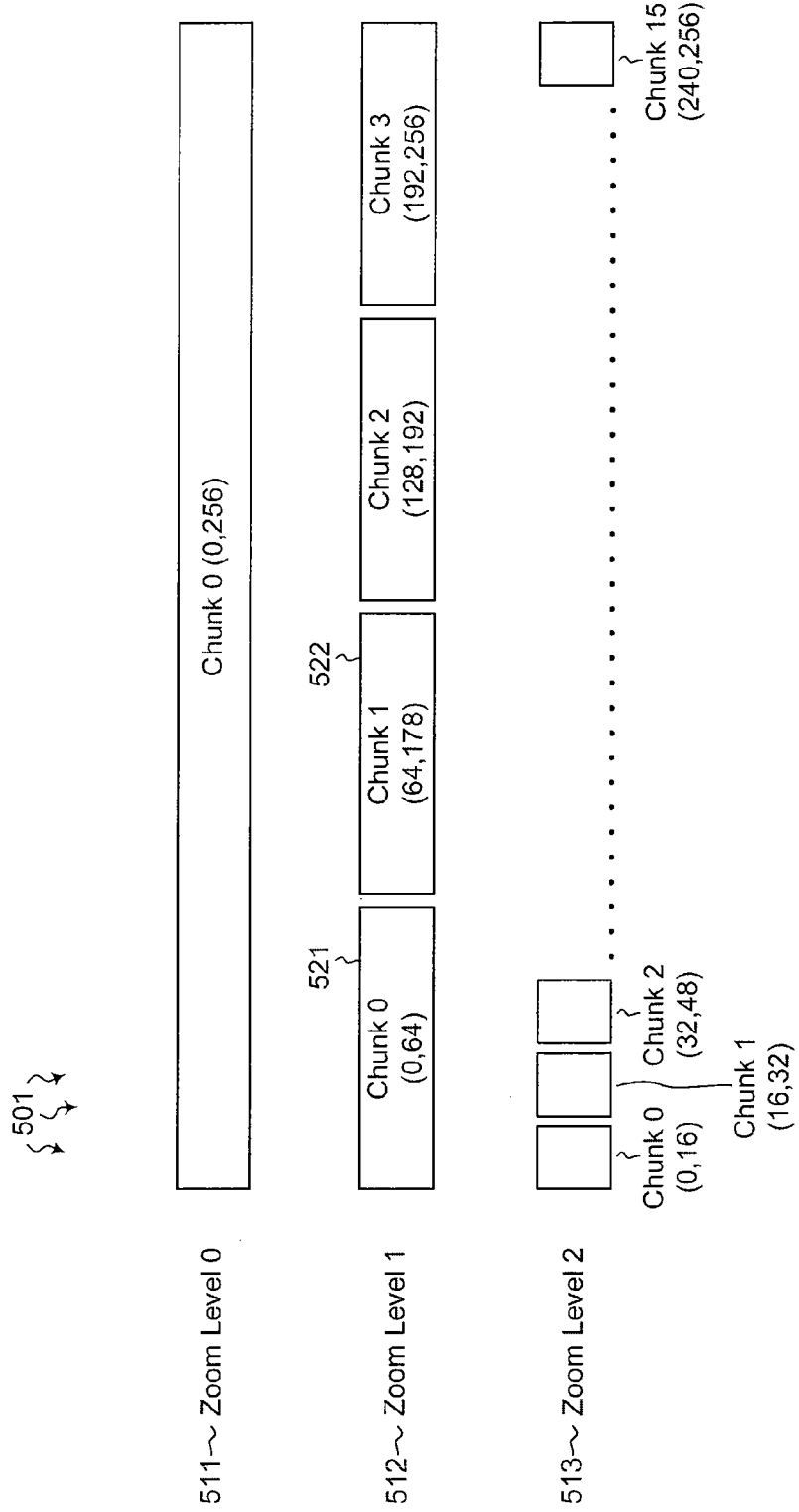
FIG. 5 illustrates an example zoom tree corresponding to the relationship between zoom level and number of chunks depicted in FIG. 4.

Turning now to FIG. 5, FIG. 5 depicts a zoom tree 501 corresponding to the relationship depicted in box 401. If visualized data is for 256 units of time, then there will be 1 chunk at zoom level 511 (0), 4 chunks at zoom level 512 (1), 16 chunks at zoom level 513 (2), etc. FIG. 5 also depicts chunk durations for the first 3 zoom levels, zoom levels 511, 512, and 513. At zoom level 511, a chunk contains 256 time units worth of data. At zoom level 512, a chunk contains 64 time units worth of data. At zoom level 513, a chunk contains 16 time units worth of data.

Returning to FIGS. 1 and 2, act 201 includes, for one or more zoom levels in the plurality of zoom levels, an act of the corresponding zoom aggregator for the zoom level aggregating a plurality of portions of raw computing activity into an aggregated event, the aggregated event for inclusion in a chunk of event presentation data for presentation at the zoom level (act 204). For example, at one or more of zoom levels 0, 1, or 2, two or more computing activities can be aggregated into a single aggregated event for inclusion in a chunk of event presentation data. Computing activities can be aggregated in accordance with event aggregation criteria 116.

As an aggregator finishes pre-calculating a chunk, it may decide to flush it to the disk or keep it in memory. In either case, it can update an indexing structure with meta-data required to look up and retrieve the pre-calculated chunk.

In some embodiments, event aggregation criteria 116 specify a corresponding "triviality" threshold for each zoom level. Each computing activity displayed on a timeline is associated with a range of time over which the activity occurred. Timeline activities that happened for a shorter duration than the corresponding triviality threshold are considered trivial at that zoom level. As used herein, "trivial" activities are activities that are too fine-grained to convey meaningful information at a particular zoom level. For example, a triviality threshold might be the range of time that is represented by a single pixel on the screen presented to the user. Activities smaller than the triviality threshold, then, may be better visualized by combining them with other trivial activities adjacent to them. Aggregation can continue on trivial activities until the next activity is not trivial, or if adding the next trivial activity would cause the size of the aggregated activity to exceed the triviality threshold. These combined trivial activities are presented as an "aggregate" activity that is more meaningful at that zoom level. Activities that are larger than the triviality threshold for that zoom level are displayed "as-is" since they are deemed to be big enough to be meaningful at that zoom level.

Figure 6:
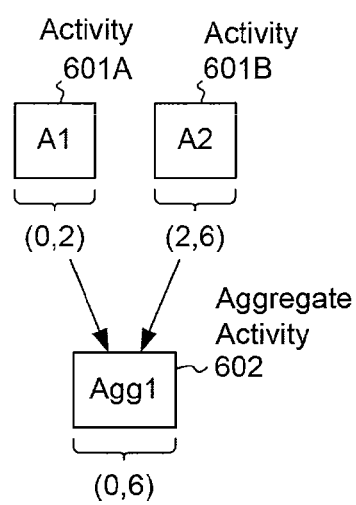
FIG. 6 illustrates an example of aggregating activities.

FIG. 6 illustrates an example of aggregating activities. It may be that a triviality threshold is 10 units of time at a certain zoom level. Each activity has an associated start and stop time. As depicted, activity 601A started at time 0 and ended at time 2, depicted as (0, 2). Activity 601B started at time 2 and ended at time 6, depicted at (2, 6). Since the combined time of activities 601A and 601B are below the triviality threshold, activities 601A and 601B are aggregated (e.g., by an appropriate event aggregator) into aggregate activity 602. Further aggregation can occur when the next computing activity is also less than 10 units of time and when the next computing activity combined with aggregate activity 602 would not exceed 10 units of time. Further aggregation can stop when the next computing activity is more than 10 units of time or when the next computing activity combined with aggregate activity 602 would exceed 10 units of time. Various different combinations of aggregation rules are also possible. For example, as long as the time of the next computing activity alone does not exceed the triviality threshold, aggregation may be allowed (even if the resulting aggregated activity exceeds the triviality threshold).

Thus, in some embodiments, pre-calculation of zoom level data for a timeline includes reference to parameters (e.g., included in an event aggregation criteria). The parameters can include one or more of: (a) a "zoom factor" to decide number of chunks at any zoom level, (b) a "triviality threshold" at any zoom level to decide whether to keep an activity as-is or to try to combine it with others, and (c) the highest zoom level up to which pre-calculation needs to be done.

Method 200 includes an act of receiving a request to visually display event presentation data within the specified time span at a specified zoom level, the specified zoom level selected from among the plurality of different zoom levels (act 205). For example, visualizer 103 can receive display request 121. As depicted, display request 121 includes zoom level 122 (e.g., a zoom level selected from among zoom levels 0, 1, 2, etc.) and display time period 123. Method 200 includes in response to the request, an act of presenting event presentation data from one or more chunks of data in the pre-calculated zoom tree at the specified zoom level (act 206). For example, visualizer 103 can present event presentation data 124 at display device 104. Event presentation data 124 can include event presentation data from one or more chunks of data corresponding to zoom level 122 (from zoom tree 118).

Referring again briefly to FIG. 5, when a visualizer (e.g., visualizer 103) is displaying event presentation data at zoom level 512 (1), 64 time units worth of data can be displayed simultaneously on a display device (e.g., display device 104). If the display time period (e.g., display time period 123) spans chunks, for example, is from time 21 to time 85, event presentation data from two chunks (chunks 521 and 522) is selected for presentation. Thus, in some embodiments, a visualizer retrieves data from at most two pre-calculated chunks to obtain all the data that is to be presented.

Embodiments of the invention also include adaptive pre-calculation of event presentation data based on chunking criteria. Thus, instead of populating a zoom tree with pre-calculated data for all zoom levels, a zoom tree may be adapted to include pre-calculated chunks only for specified data regions.

Figure 3:
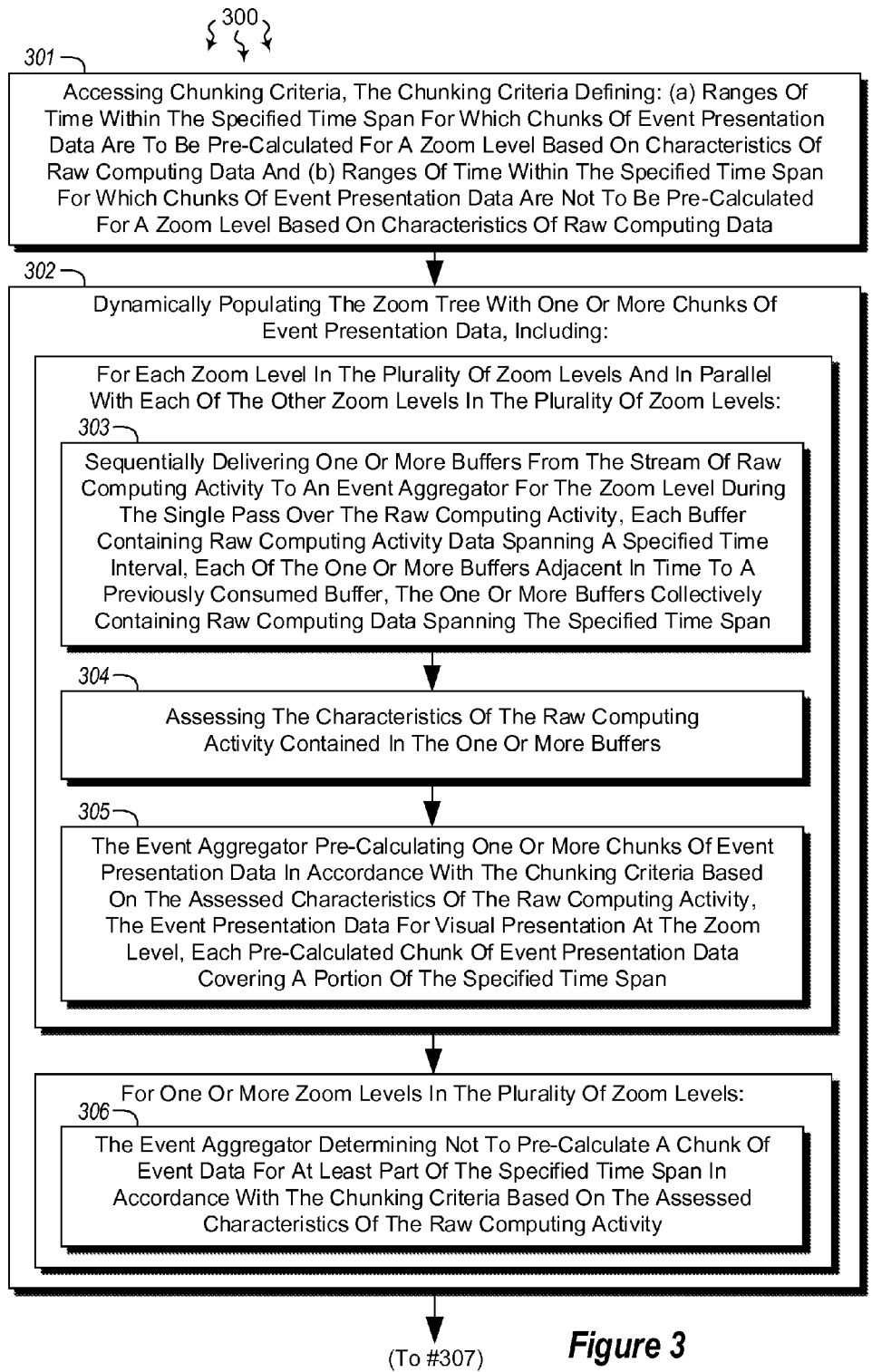
FIG. 3 illustrates a flowchart of an example method for adaptively calculating zoom level timeline data.
Figure 3:
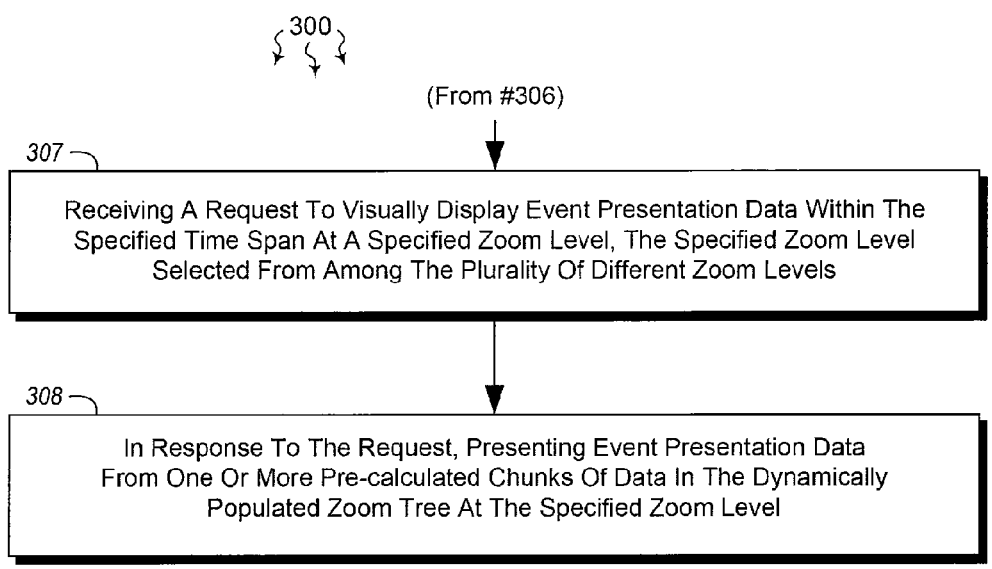

FIG. 3 illustrates a flowchart of an example method 300 for adaptively calculating zoom level timeline data. The method 300 will be described with respect to the components and data in computer architecture 100.

Method 300 includes an act of accessing chunking criteria, the chunking criteria defining: (a) ranges of time within the specified time span for which chunks of event presentation data are to be pre-calculated for a zoom level based on characteristics of raw computing data and (b) ranges of time within the specified time span for which chunks of event presentation data are not to be pre-calculated for a zoom level based on characteristics of raw computing data (act 301). For example, event aggregators 102 can access chunking criteria 117. Chunking criteria 117 can define ranges of time within time span 112 for which chunks of event presentation data are to be pre-calculated for each of zoom levels 0, 1, 2, etc., based on characteristics of raw stream 111. Chunking criteria 117 can also define ranges of time within time span 112 for which chunks of event presentation data are not to be pre-calculated for each of zoom levels 1, 2, etc., based on characteristics of raw stream 111.

In some embodiments, chunking criteria 117 define when pre-calculation of chunks are to occur based on data density for the chunk's range of time. When data within the chunk's time range is sufficiently dense, a chunk is to be pre-calculated for the time range. On the other hand, when data within the chunk's time range is not sufficiently dense (or is "sparse"), a chunk is not to be pre-calculated for the time range.

Figure 7:
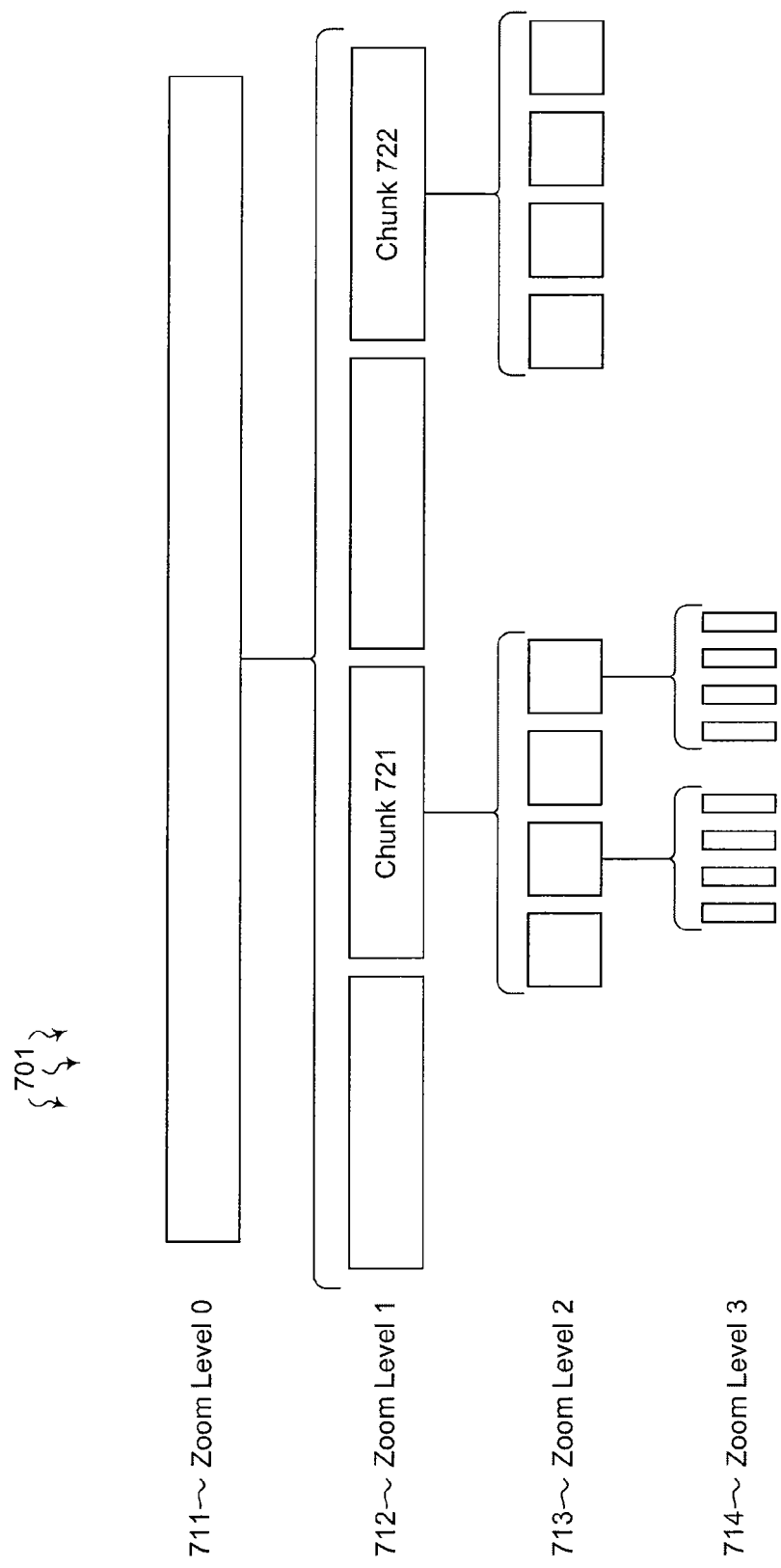
FIG. 7 illustrates an example zoom tree have pre-calculated chunks of variable depth.

Method 300 includes an act of dynamically populating the zoom tree with one or more chunks of event presentation data (act 302). For example, event aggregators 102 can dynamically populate a zoom tree with one or more chunks of event presentation data in accordance with chunking criteria 117. Turning to FIG. 7, FIG. 7 illustrates an example zoom tree 701 that has pre-calculated chunks of variable depth. Event aggregators 102 can populate zoom tree 701. A further event aggregator (not shown) can be included in event aggregators 102 to pre-calculate chunks for zoom level 714 (3).

Turning back to FIGS. 1 and 3, act 302 includes for each zoom level in the plurality of zoom levels and in parallel with each of the other zoom levels in the plurality of zoom levels an act of sequentially delivering one or more buffers from the stream of raw computing activity to an event aggregator for the zoom level during the single pass over the raw computing activity, each buffer containing raw computing activity data spanning a specified time interval, each of the one or more buffers adjacent in time to a previously consumed buffer, the one or more buffers collectively containing raw computing data spanning the specified time span (act 303). For example (and similar to act 202), buffer formulation module 101 can sequentially deliver adjacent buffers 114 (buffer 114A, 114B, 114C, etc) to event aggregators 131, 132, 133, etc., in parallel with one another during a single pass over raw stream 111.

Act 302 includes for each zoom level in the plurality of zoom levels and in parallel with each of the other zoom levels in the plurality of zoom levels an act of assessing the characteristics of the raw computing activity contained in the one or more buffers (act 304). For example, event aggregators 131, 132, 133, etc., can assess the characteristics of raw computing activity (from raw stream 111) in buffers 114A, 114B, 114C, etc. Assessing raw computing activity can include assessing data density characteristics of raw computing activity within one or more data regions.

Act 302 includes for each zoom level in the plurality of zoom levels and in parallel with each of the other zoom levels in the plurality of zoom levels an act of the event aggregator pre-calculating one or more chunks of event presentation data in accordance with the chunking criteria based on the assessed characteristics of the raw computing activity, the event presentation data for visual presentation at the zoom level, each pre-calculated chunk of event presentation data covering a portion of the specified time span (act 305). For example, turning again to FIG. 7, event aggregators 102 can pre-calculate chunks of event presentation data as arranged in zoom tree 701. Event aggregators 102 can pre-calculate chunks in zoom tree 701 in accordance with chunking criteria 117 based on assessed characteristics of computing activity in buffers 114A, 114B, 114C, etc. For example, an event aggregator for a zoom level can determine that data density within a specified data region at the zoom level is sufficiently dense in accordance with chunking criteria 117. When data density is sufficiently dense, a data chunk can be pre-calculated.

Method 300 includes for one or more zoom levels in the plurality of zoom levels, an act of the event aggregator determining not to pre-calculate a chunk of event data for at least part of the specified time span in accordance with the chunking criteria based on the assessed characteristics of the raw computing activity (act 306). For example, event aggregators 102 can determine not to pre-calculate chunks of event presentation data at various locations in zoom tree 701. Event aggregators 102 can determine not to pre-calculate chunks for inclusion in zoom tree 701 in accordance with chunking criteria 117 based on assessed characteristics of computing activity in buffers 114A, 114B, 114C, etc. For example, an event aggregator for a zoom level can determine that data density within a specified data region at the zoom level is insufficiently dense in accordance with chunking criteria 117. When data density is insufficiently dense, a data chunk is not pre-calculated. That is, an event aggregator for a zoom level can determine whether a specified data region at the zoom level is sparse (i.e., a data region with insufficiently dense data) in accordance with chunking criteria 117.

In this manner, a resulting zoom tree has a variable and continually changing depth. For example, when the data density is below a specified threshold number (or is sparse), the creation of new tree forks in the zoom tree can be halted. As such, the density of the computing activities determines the size and depth of the pre-calculated data chunks in the zoom tree. Accordingly, adequate pre-calculation is performed to provide the user with a responsive experience, while avoiding excessive and unnecessary pre-calculation.

Turning back to FIGS. 1 and 3, method 300 includes an act of receiving a request to visually display event presentation data within the specified time span at a specified zoom level, the specified zoom level selected from among the plurality of different zoom levels (act 307). For example, visualizer 103 can receive display request 121. As depicted, display request 121 includes zoom level 122 (e.g., a zoom level selected from among zoom levels 0, 1, 2, etc.) and display time period 123.

Method 300 includes in response to the request, an act of presenting event presentation data from one or more pre-calculated chunks of data in the dynamically populated zoom tree at the specified zoom level (act 308). For example, visualizer 103 can present event presentation data 124 at display device 104. Event presentation data 124 can include event presentation data from one or more chunks of data corresponding to zoom level 122 (from zoom tree 701).

Accordingly, an adaptive pre-calculation scheme can depend upon the notion of density of data in a given range of time. As used herein, the "density" of data is the total number of activities that overlap with (i.e. lie completely or partially inside) that range of time. If this count is below a certain threshold (e.g. less than 1000 activities in the range of time), then data density in that range of time is considered to be sparse. In one example, suppose at a certain zoom level and for a certain time range of interest, the data density is considered sparse. The adaptive scheme can alternately store raw data for that chunk (or simply perform no action) instead of pre-calculating and storing zoom-level data for that chunk. In addition, the adaptive scheme would ignore that range of time for all zoom levels higher than that zoom level.

Each zoom level has a specified number of data chunks. For regions of time that have a high density of execution data activities, pre-calculation of chunks may be formed at a greater number of levels than for time regions with low data density. The execution data may be aggregated per zoom level. Thus, with further reference to FIG. 7 the rows represent different zoom levels 711, 712, 713, and 714. Data chunks may be pre-calculated in more depth for certain branches of the tree 700. As depicted in FIG. 7, further pre-calculated chunks are included at higher zoom levels below chunks 721 and 722.

Event presentation data for a sparse data region is calculated from raw computing activity in response to a display request (e.g., essentially in real-time). Responsive (essentially real-time) calculation of event presentation data for sparse data regions can be resource efficient. A data region containing a relatively small amount of computing activity can be quickly aggregated for the requested zoom level. Metadata may be used to record information indicating how to look the execution data up. For example, portions of event presentation data 124 can be calculated directly from computing events in raw stream 111.

For example, in response to a user display request, visualizer 103 determines whether data was pre-calculated for each of the (possibly two) chunks required to satisfy that request. If pre-calculated data is available, it is retrieved and displayed to the user. If one or both of the chunks were not pre-calculated, visualizer 103 refers to raw computing activity (e.g., raw stream 111) for a specified time range. Visualizer 103 calculates further event presentation data from the raw computing activity in essentially real time. Visualizer 103 dynamically aggregates pre-calculated and responsively calculated event presentation data for presentation (e.g., at display device 104) at the requested zoom level.

Accordingly, an execution visualizer ("EV") can be used to visualize the execution of a program (e.g. executing processes) over a range of time. The EV can display a visualization of a timeline of program activity. The timeline may include a specified range of time. The timeline may include several channels, each channel representing entities like application threads, or machine resources such as hard disks. Each channel depicts activities that happen over a range of time or at an instant in time. The user 102 can zoom in on a small region of the timeline to see details of the activities in that region, zoom out to get a general picture of a large region, and scroll forward or backward in time at the same zoom level to see other activities that happened adjacent to the region that was being visualized.

The underlying execution data being visualized might be quite large (multiple gigabytes, terabytes or more). The data size grows in proportion to the number of elements in the timeline. The execution visualizer manages this data volume by limiting the amount of information it presents to the user at a time in a single screen (e.g. display device 104). When the user zooms out, the tool shows a coarse-granularity picture that summarizes (shows in low resolution) the activities over that large range of time. As the user zooms in, more details emerge for the progressively smaller regions of time being focused on. At the highest zoom level (zoomed in the most), all details are presented, but only for the small duration of time selected. Thus the EV shows only a small amount of data in response to any user request for timeline data.

In some embodiments, rather than calculating the zoom-level data dynamically from raw data each time, the EV pre-calculates timeline information for various zoom levels to allow for smooth response to user actions like scrolling and zooming. Pre-calculation can be performed in an "analysis" phase before the user interacts with the EV. Pre-calculation can be done for all allowed zoom levels for the duration of a trace, or for a subset of the zoom levels, or for a subset of the time. For each zoom level, time is divided into a set of chunks, and the portion of the timeline data that lies within that chunk is pre-calculated at a granularity appropriate for that zoom level and stored in zoom tree 111. At lower (more zoomed out) zoom levels, the chunks are bigger in size and fewer in number and pre-calculated data is at coarser granularity. On the other hand, at high (more zoomed in) zoom levels, there are more chunks, each chunk containing a smaller range of time and data at finer granularity (i.e. capturing more detail).

At visualization time, a user can request timeline information for a range of time at a certain zoom level. In response, the EV looks up any pre-calculated data for that zoom level and for that range of time (or the best fitting range that contains the requested range of time). The data is retrieved and returned to the user. The EV can refer to recorded metadata to locate raw execution data. From the raw execution data, the EV can responsively calculate further presentation data. Accordingly, embodiments of the invention include an algorithm for forming an optimal zoom tree from a single pass over a set of execution data or computing activities.

In further embodiments, the number of different event aggregators used to pre-calculate event presentation data varies at different times within a specified time span. Data density of the input data is used as the chunking criteria 117. Based on chunking criteria 117 a chunk is pre-calculated if there are equal to or more than a threshold (e.g. 1000) number of activities within the duration of the chunk, and input data is considered dense for that time range. Chunking criteria 117 decides to not pre-calculate the chunk if there are less than the threshold number of input activities for the time range of the chunk, and input data is considered sparse for that time range.

A zoom tree is dynamically populated with one or more chunks of event presentation data. For each zoom level in the plurality of zoom levels and in parallel with each of the other zoom levels in the plurality of zoom levels, one or more buffers from the stream of raw computing activity are sequentially delivered to an event aggregator for the zoom level during the single pass over the raw computing activity. Each buffer contains raw computing activity data. Each of the one or more buffers is adjacent in time to a previously consumed buffer. The one or more buffers collectively contain raw computing data spanning the specified time span.

At any point in time for the input data, out of the plurality of event aggregators, a stack of "active" aggregators is maintained. These are aggregators for which, based on chunking criterion 117, data is considered dense (i.e., answered "yes") and are thus pre-calculating chunks for that point in time. As the input data is processed, the stack grows and shrinks. This stack contains all aggregators from a bottom zoom level 0 to a top level x, where x is less than or equal to the maximum zoom level to be pre-calculated. Based on chunking criterion 117, therefore, data is considered sparse (i.e., answered "no") for the chunk for all zoom levels greater than x.

As input buffers are processed, the stack can shrink or grow. The stack grows for input time ranges for which data is dense, and shrinks for time ranges for which data is sparse. For denser input data regions in time, more aggregators for higher zoom levels are activated and pushed on to the stack to pre-calculate chunks for those regions, because the chunking criterion answers "yes" for those zoom levels. Conversely, for sparser input regions, some of the aggregators at the top of the stack might be deactivated, because the chunking criterion answered "no" for those zoom levels for chunks corresponding to those regions.

The chunking criterion answers "yes" for a chunk at a zoom level whenever it knows that at least a threshold (e.g. 1000) number of activities will be contained in that chunk. Buffer formulation module 101 forms buffers that contain less than or equal to the threshold number of activities chosen to facilitate chunking decisions.

Buffer formulation module 101 proceeds as follows. It looks ahead to the next threshold number of activities. Within this look-ahead set, it tries to find the lowest zoom level, say x, for which a chunk is contained entirely within the set, and whose start time matches the start time of the buffer. If such a zoom level is found, then the buffer is chosen to be the set of activities that lie within the chunk boundary for zoom level x for the selected time range. Based on chunking criterion 117, then, aggregators up to zoom level (x−1) can be activated and aggregators deactivated for zoom level x and beyond for that buffer's range of time.

If buffer formulation criteria 136 doesn't find such a zoom level x, then the data is dense for all zoom levels, and the entire set of look-ahead events is sent as the next buffer and aggregators for all the zoom levels to be pre-calculated are activated. Buffer formulation module 101 keeps on delivering such buffers until it can find a set of look-ahead events in which the chunk for the highest zoom level ends, and returns the buffer up to the point at which the chunk ends.

Aggregation, zoom tree formation, and visualization can then proceed as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including one or more processors and system memory, the computer system configured to generate visual presentation data representative of computing activities, the visual presentation data generated from buffers containing raw computing activity data for presentation at a plurality of different zoom levels, the plurality of zoom levels varying from a configurable lowest zoom level to a configurable highest zoom level, the plurality of zoom levels having at least one intermediate zoom level between the lowest zoom level and the highest zoom level, each zoom level in the plurality of zoom levels having a specified chunk size covering a specified amount of time, the chunk size for lower zoom levels covering larger specified amounts of time so as to generate visual presentation data with coarser granularity, the chunk size for higher zoom levels covering smaller specified amounts of time so as to generate visual presentation data with finer granularity, the visual presentation data for presentation at a visualizer component, the visualizer component configurable to transition the presentation of the visual presentation data between the plurality of different zoom levels, the computer system also including a plurality of zoom level activity aggregators, each zoom level activity aggregator configured to process raw computing activity data into visual presentation data for presentation at a specified zoom level selected from among the plurality of different zoom levels, a method for formulating visual presentation data for presentation at each of the plurality of different zoom levels for a specified time period, the method comprising:

an act of receiving a buffer, the buffer including raw computing activity data for a first time period within the specified time period, the first time period having a start time and an end time;

an act of determining that a portion of the buffer is sparsely populated by determining that the data density within the portion of the buffer is below a threshold data density, the portion of the buffer being from the start time to an intermediate time, the intermediate time being prior to the end time;

an act of identifying a cutoff zoom level, zoom levels above the cutoff zoom level covering specified amounts of time that are completely within the buffer portion, zoom levels at and below the cutoff zoom level covering specified amounts of time that extend outside the buffer portion;

an act of accessing a dynamically variable zoom level activity aggregator stack, the zoom level activity aggregator stack including a plurality of zoom level activity aggregators for zoom levels ranging from a specified lowest zoom level to a specified higher zoom level, the depth of the dynamically variable aggregator stack being variable depending on the data density of the raw computing activity data;

for each zoom level activity aggregator in the zoom level activity aggregator stack, an act of sending the buffer to the zoom level activity aggregator for processing to generate pre-calculating visual presentation data chunks for a corresponding zoom level;

for any zoom levels above specified higher zoom level up to and including the cutoff zoom level:

an act of configuring a zoom level activity aggregator for the zoom level;

an act of sending the buffer to the configured zoom level activity aggregator for processing to generate visual presentation data for the zoom level; and an act of pushing the configured zoom level activity aggregator onto the zoom level activity aggregator stack;

subsequent to pushing zoom level activity aggregators for any zoom levels onto the zoom level activity aggregator stack and for each zoom level activity aggregator on the zoom level activity aggregator stack starting with the zoom level activity aggregator for the cutoff zoom level and moving incrementally down to zoom level activity aggregators for lower zoom levels:

an act of determining if a pre-calculated data chunk for a designated zoom level was completed and flushed out as a result of consuming the buffer; and an act of dropping the zoom level activity aggregator for the designated zoom level from the zoom level activity aggregator stack, when it is determined that the pre-calculated data chunk was completed and flushed out.

2. The method of claim 1, wherein portions of raw computing activity data that were not pre-calculated are dynamically aggregated at visualization time.

3. The method of claim 2, wherein both the pre-calculated data chunks and the dynamically aggregated data are used to present the requested data at the specified zoom level.

4. The method of claim 1, further comprising:

an act of determining that none of the execution data was pre-calculated at a zoom level specified by a user;

an act of dynamically generating one or more data chunks representing the execution data at the zoom level specified by the user; and an act of using the dynamically generated data chunks representing the execution data to present the requested data at the specified zoom level.

5. A computer-implemented method for producing an execution visualizer showing a timeline of presentation data representing application execution dynamics, by generating the execution visualizer based on a zoom tree populated with event presentation data pre-calculated for multiple zoom levels, the pre-calculation based on a single pass over raw computing activities for a specified time span, and the computer-implemented method comprising acts of:

formulating, based on buffer formulation criteria that comprises a time span and a buffer time interval, a plurality of buffers that receive a stream of raw computing activities that represent execution dynamics in a single pass of the stream of raw computing activities over the time span;

for each different zoom level in a zoom tree:
receiving in parallel from the plurality of buffers the stream of raw computing activities from the plurality of buffers;
pre-calculating in parallel for each zoom level the stream of raw computing activities by aggregating the stream of raw computing activities so as to prepare one or more chunks of event presentation data for each zoom level based on the pre-calculated stream of raw computing activities for each zoom level, the pre-calculation based at least on:
chunking criteria that defines a chunk of time for which a portion of the stream of raw computing activities is to be pre-calculated based on an amount of time displayed on a single screen for a given zoom level; and
event aggregation criteria that determines how computing activities are to be combined for each chunk of a given zoom level;
populating each different zoom level in the zoom tree with the one or more pre-calculated chunks of presentation data prepared for each different zoom level; and
in response to a request to display presentation data specified in the request by a zoom level and a display time period, retrieving from the zoom tree one or more pre-calculated chunks of presentation data for the specified zoom level and display time; and
presenting the retrieved one or more chunks of presentation data as a timeline for the specified display time.

6. The computer-implemented method as recited in claim 5, wherein the event aggregation criteria comprises a triviality threshold specified for one or more zoom levels, and wherein aggregating the stream of raw computing activities so as to prepare the one or more pre-calculated chunks of event presentation data for each zoom level comprises performing a triviality determination to determine if certain portions of the stream of raw computing activities are trivial for the one or more zoom levels for which a triviality threshold is specified.

7. The computer-implemented method as recited in claim 6, wherein for the one or more zoom levels for which a triviality threshold is specified, aggregating the stream of raw computing activities so as to prepare the one more pre-calculated chunks of event presentation data for each zoom level comprises aggregating a plurality of portions of the stream of raw computing activities determined to be trivial into a single aggregated event.

8. The computer-implemented method as recited in claim 5, wherein pre-calculating in parallel for each zoom level the stream of raw computing activities for each zoom level comprises adaptively pre-calculating at least some chunks of the stream of raw computing activities by determining, based on assessed characteristics of the at least some chunks of the stream of raw computing activities, not to pre-calculate the at least some chunks of the stream of raw computing activities for one or more zoom levels.

9. The computer-implemented method as recited in claim 8, wherein the chunking criteria comprises defining a density criteria that specifies when chunks of time are not to be pre-calculated for one or more zoom levels because the specified chunks of time do not contain sufficient data within the specified chunks of time to meet the density criteria.

10. The computer-implemented method as recited in claim 9, wherein presenting the retrieved one or more chunks of presentation data further comprises generating event presentation data in real time for any chunks of time at any zoom level for which a determination was made not to pre-calculate the chunk of time based on failure of said any chunks of time to meet the density criteria.

11. The computer-implemented method as recited in claim 5, wherein the request to display presentation data comprises including one of a scroll request and a zoom request.

12. The computer-implemented method as recited in claim 11, wherein presenting the retrieved presentation data comprises transitioning to the retrieved event presentation data in response to the one of the scroll request and the zoom request.

13. The computer-implemented method as recited in claim 5, further comprising either flushing a pre-calculated chunk to disk or storing the pre-calculated chunk in memory, and updating an indexing structure with meta-data for accessing the pre-calculated chunk.

14. A computing system structured with an architecture for producing an execution visualizer showing a timeline of presentation data representing application execution dynamics, by generating the execution visualizer based on a zoom tree populated with event presentation data pre-calculated for multiple zoom levels, the pre-calculation based on a single pass over raw computing activities for a specified time span, the computing system comprising:
a buffer formulation module that formulates, based on buffer formulation criteria that comprises a time span and a buffer time interval, a plurality of buffers that receive a stream of raw computing activities that represent execution dynamics in a single pass over the time span;
a plurality of event aggregators each corresponding to a different zoom level in a zoom tree, the event aggregators receiving in parallel from the plurality of buffers the stream of raw computing activities from the plurality of buffers, and each of the event aggregators comprising one or more processors executing computer-executable instructions which cause the event aggregators to perform the following process in parallel for each of the different zoom levels of the zoom tree:
pre-calculating the stream of raw computing activities for each zoom level by aggregating the stream of raw computing activities so as to prepare one or more chunks of event presentation data for each zoom level based on the pre-calculated stream of raw computing activities for each zoom level, the pre-calculation based at least on:
chunking criteria that defines a chunk of time for which a portion of the stream of raw computing activities is to be pre-calculated based on an amount of time displayed on a single screen for a given zoom level; and
event aggregation criteria that determines how computing activities are to be combined for each chunk of a given zoom level;
generating the zoom tree by populating each different zoom level in the zoom tree with the one or more pre-calculated chunks of presentation data prepared for each different zoom level; and
a visualizer component which receives a request to display presentation data specified in the request by a zoom level and a display time period, the visualizer component retrieving from the zoom tree one or more pre-calculated chunks of presentation data for the specified zoom level and display time in response to the received request; and a display device presenting the retrieved one or more chunks of presentation data as a timeline for the specified display time.

15. The computer system as recited in claim 14, wherein the event aggregation criteria comprises a triviality threshold specified for one or more zoom levels, and wherein each of the event aggregators comprising one or more processors executing computer-executable instructions cause the event aggregators to aggregate the stream of raw computing activities so as to prepare the one or more pre-calculated chunks of event presentation data for each zoom level by further performing a triviality determination to determine if certain portions of the stream of raw computing activities are trivial for the one or more zoom levels for which a triviality threshold is specified.

16. The computer system as recited in claim 15, wherein for the one or more zoom levels for which a triviality threshold is specified, each of the event aggregators comprising one or more processors executing computer-executable instructions cause the event aggregators to aggregate the stream of raw computing activities so as to prepare the one more pre-calculated chunks of event presentation data for each zoom level by aggregating a plurality of portions of the stream of raw computing activities determined to be trivial into a single aggregated event.

17. The computer system as recited in claim 14, wherein each of the event aggregators comprising one or more processors executing computer-executable instructions cause the event aggregators to pre-calculate the stream of raw computing activities for each zoom level by adaptively pre-calculating at least some chunks of the stream of raw computing activities by determining, based on assessed characteristics of the at least some chunks of the stream of raw computing activities, not to pre-calculate the at least some chunks of the stream of raw computing activities for one or more zoom levels.

18. The computer system as recited in claim 17, wherein the chunking criteria comprises defining a density criteria that specifies when chunks of time are not to be pre-calculated for one or more zoom levels because the specified chunks of time do not contain sufficient data within the specified chunks of time to meet the density criteria.

19. The computer system as recited in claim 18, wherein when presenting the retrieved one or more chunks of presentation data, the visualizer further generates event presentation data in real time for any chunks of time at any zoom level for which a determination was made not to pre-calculate the chunk of time based on failure of said any chunks of time to meet the density criteria.

20. The computer system as recited in claim 14, wherein the request to display presentation data comprises including one of a scroll request and a zoom request.

21. The computer system as recited in claim 20, wherein when presenting the retrieved presentation data the visualizer transitions to the retrieved event presentation data in response to the one of the scroll request and the zoom request.

22. The computer system as recited in claim 14, wherein each of the event aggregators comprising one or more processors executing computer-executable instructions cause the event aggregators to either flush a pre-calculated chunk to disk or store the pre-calculated chunk in memory, and then update an indexing structure with meta-data for accessing the pre-calculated chunk.

23. A computer program product comprising one or more storage devices containing computer-executable instructions executable by one or more processors for implementing within a computing environment a method for producing an execution visualizer showing a timeline of presentation data representing application execution dynamics, by generating the execution visualizer based on a zoom tree populated with event presentation data pre-calculated for multiple zoom levels, the pre-calculation based on a single pass over raw computing activities for a specified time span, and the computer-implemented method comprising acts of:

formulating, based on buffer formulation criteria that comprises a time span and a buffer time interval, a plurality of buffers that receive a stream of raw computing activities that represent execution dynamics in a single pass over the time span;

for each different zoom level in a zoom tree:
receiving in parallel from the plurality of buffers the stream of raw computing activities from the plurality of buffers;
pre-calculating in parallel for each zoom level the stream of raw computing activities by aggregating the stream of raw computing activities so as to prepare one or more chunks of event presentation data for each zoom level based on the pre-calculated stream of raw computing activities for each zoom level, the pre-calculation based at least on:
chunking criteria that defines a chunk of time for which a portion of the stream of raw computing activities is to be pre-calculated based on an amount of time displayed on a single screen for a given zoom level; and
event aggregation criteria that determines how computing activities are to be combined for each chunk of a given zoom level;

populating each different zoom level in the zoom tree with the one or more pre-calculated chunks of presentation data prepared for each different zoom level; and in response to a request to display presentation data specified in the request by a zoom level and a display time period, retrieving from the zoom tree one or more pre-calculated chunks of presentation data for the specified zoom level and display time; and presenting the retrieved one or more chunks of presentation data as a timeline for the specified display time.

* * * * *